United States Patent [19]
Yoshikawa et al.

[11] Patent Number: 5,342,669
[45] Date of Patent: Aug. 30, 1994

[54] OPTICAL INFORMATION RECORDING MEDIUM

[75] Inventors: Tadao Yoshikawa; Kyoko Okamoto; Tokuo Ikari, all of Kurashiki, Japan

[73] Assignee: Kuraray Co., Ltd., Kurashiki, Japan

[21] Appl. No.: 858,869

[22] Filed: Mar. 27, 1992

[30] Foreign Application Priority Data

Apr. 2, 1991 [JP] Japan .................................. 3-069962

[51] Int. Cl.$^5$ .............................................. B32B 3/00
[52] U.S. Cl. ........................................ 428/64; 428/65; 428/913; 430/270; 430/945; 346/76 L; 346/135.1
[58] Field of Search ................ 428/64, 65, 447, 913; 430/270, 945; 346/76 L, 135.1; 369/288

[56] References Cited

U.S. PATENT DOCUMENTS 4,849,304 7/1989 Uchiyama et al. .
5,053,288 10/1991 Hashimoto et al. ................. 428/694

FOREIGN PATENT DOCUMENTS 0024136 2/1981 European Pat. Off. .
0049821 4/1982 European Pat. Off. .
0385341 9/1990 European Pat. Off. .
0467705 1/1992 European Pat. Off. .
4-11337 1/1992 Japan .

OTHER PUBLICATIONS

Patent Abstract of Japan, vol. 10, No. 55, (M-458)(2112), Mar. 5, 1986, & JP-A-60 203 489, Oct. 15, 1985.
Patent Abstracts of Japan, vol. 15, No. 451, (P-1276), Nov. 15, 1991, & JP-A-3 189 940, Aug. 19, 1991.

Primary Examiner—Patrick J. Ryan
Assistant Examiner—Elizabeth Evans
Attorney, Agent, or Firm—Oblon, Spivak, McClelland, Maier & Neustadt

[57] ABSTRACT

Optical information recording medium that has resistance to scratching, resistance to friction static electricity, rapid discharging, resistance to dust adhesion on surface, thus having high reliability. The optical information recording medium has one or more substrates and one or more recording layers, and, respectively, one or more hardening coats and one or more antistatic coats provided on one or two sides of the optical information recording medium.

8 Claims, 1 Drawing Sheet

OPTICAL INFORMATION RECORDING MEDIUM

FIELD OF THE INVENTION

This invention relates to an optical information recording medium enabling writing and/or reading of information by laser beam.

BACKGROUND OF THE INVENTION

Optical information recording media, such as optical disks, optical cards and mass storage disk memory for computers have been developed and produced on a commercial basis in recent years. Polycarbonate resin and acryl resin are proposed as materials of substrates for these optical information recording media for their superiority in optical characteristics and molding characteristics. However, they are not necessarily satisfactory.

Such polycarbonate and acryl resins are not fully hardened, so that they are soon scratched. Also they are easily charged by static electricity which is hard to be discharged, so that dust soon adheres on their surfaces. When scratched or dust adheres on the surface of the optical information recording disk on which laser beams impinge, failure on recording, replaying and erasing may occur and such lessens the reliability of the optical information recording medium.

To obviate such defects, it is known to apply thermohardening resin or ultra violet hardening resin on the surface of the optical information recording medium and hardening them on the surface to form a relatively hard organic overcoat in order to prevent scratching.

Also, it has been proposed to include a metal, semiconductor, antistatic agent and surface active agent in the thermohardening resin coat or ultra violet hardening resin coat in order to prevent dust from adhering, that is to impart antistatic property to them.

However, while a thermohardening resin coat or ultra violet hardening resin coat on the surface of the optical information recording medium increases its hardness, nevertheless, its antistatic ability does not improve by including these materials.

Also, by using a coat including metal, semi-conductor, surface active agent or antistatic agent, the antistatic ability is improved, but the hardness is not improved.

To solve the above-mentioned problems one can consider to include these metal, semi-conductor, surface active agent or antistatic resin into the coats of thermohardening resin and ultra violet resin. However, both the hardness and the antistatic ability are not much improved thereby. Specifically, in the case of considering an improvement in hardness, the antistatic ability goes down, because the content of the ultra violet hardening resin and so on increases. Contrawise, in the case of considering an improvement of the antistatic ability full hardness can not be achieved once the content of the surface active agent and so on increases. Also in both of these cases the problems such as a decline of the hardening speed, a decline of the light transmittance, surface pollution and a decline or the coat adhesion of the thermohardening resin and the ultra violet hardening resin occurs.

SUMMARY OF THE INVENTION

An object of this invention is to impart to an optical information recording medium the following improved characteristics, that is, resistance to scratching, resistance to friction static electricity, rapid discharging, resistance to dust adhesion on its surface, so that high reliability is achieved.

Another object of this invention is an optical information recording medium having one or more substrates and one or more recording layers, and respectively providing one or more hardening coats and one or more antistatic coats on one side or two sides of the optical information recording medium.

It is preferably for the hardening coat provided on the surface layer of the optical information recording medium in this invention that its tensile strength is not less than 100 kg/cm$^2$ (at 20° C.), and/or its elongation percentage is not more than 20% (at 20° C.), and/or its elastic modulus is not less than $1 \times 10^9$ dyne/cm (at 25° C., frequency 3.5 Hz), since the hardening coat can not be cracked easily even in the case when the substrate is deformed a little by heat or moisture. Also it is preferably for the hardening coat that its surface hardness (pencil hardness) is not less than HB, more not less than H, and almost never be scratched in a steel-wool test, thereby being fully resistant to scratching. Also, it is preferable that its water vapor transmission ratio is not more than 400 g/m$^2$-4 hr. (at thickness of coat 100 μm, temperature 60° C., relative humidity 90%), thereby preventing the deterioration of the quality of the recording coat by moisture or other impurities.

An ultra violet hardening resin is preferable for such hardening coat in view of its utility, workability and productivity although it is possible to choose from an ultra violet hardening resin coat, a thermohardening resin coat, an electron beam hardening resin coat or a plasma polymerized coat. Among them, an ultra violet hardening resin coat comprising multifunctional (metha) acrylate having three or more acryloyl groups in the molecule, mono-functional or di-functional (metha) acrylate or N-vinyllactam, and comprising a photopolymerization initiator is preferable.

For example, as multifunctional (metha) acrylate having three or more acryloyl groups in the molecule, that is, multi-alcoholpoly (metha) acrylate are, for instance, trimethylolpropanetri (metha) acrylate, pentaerythrytoltri(metha) acrylate, pentaerythrytoltetra (metha) acrylate, pentaglyceroltri (metha) acrylate, glycerinetri (metha) acrylate, dipentaerythrytoltri (metha) acrylate, pentaerythrytoltetra (metha) acrylate, dipentaerythrytolpenta (metha) acrylate, dipentaerythrytolhexa (metha) acrylate, and urethaneacrylate which is composed of a (metha) acrylmonomer having not less than three moles of hydroxyl groups reacted with a polyisocyanate. Mixing two or more kinds of these multifunctional monomers also is possible.

For example the following are examples of monofunctional or di-functional (metha) acrylate: 2-hydroxyethyl (metha) acrylate, 2-ethylhexyl (metha) acrylate, dicyclopentanyl (metha) acrylate, phenoxyhydroxypropyl (metha) acrylate, tetrahydrofurfuryl (metha) acrylate.

Also, the following are examples of N-vinyllactam: N-vinyl-2-caprolactam, N-vinyl-3-methyl-2-pyrrolidone, N-vinyl-3-methyl-2-piperidone, N-vinyl-3-methyl-2-caprolactam, N-vinyl-4-methyl-2-pyrrolidone, N-vinyl-4-methyl-2-piperidone, N-vinyl-4-methyl-2-caprolactam, N-vinyl-5-methyl-2-pyrrolidone, N-vinyl-5-methyl-2-piperidone, N-vinyl-3-methyl-2-pyrrolidone, N-vinyl-4,5-dimethyl-2-pyrrolidone, N-vinyl-5,5-dimethyl-2-pyrrolidone, N-vinyl-3,5,5-trimethyl-2-pyrrolidone, N-vinyl-5-methyl-5-ethyl- 2-pyrrolidone, N- vinyl-3,4,5-trimethyl-3-ethyl-2-pyrrolidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl-7-methyl-2-caprolactam, N-vinyl-7-ethyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam. Mixing two or more kinds of mono-functional or di-functional (metha) acrylate and N-vinyllactam also is possible.

For the photo polymerization initiator, it is sufficient that it produces radicals. It is possible to use initiators of intramolecular bridge cleavage type and/or intermolecular hydrogen drawing type. They are, for example, chloro acetophenone, diethoxyacetophenone, 1-phenyl-2-hydroxy-2-methylpropane-1-one,1-hydroxycyclohexylphenylketone, 2-methyl-1-(4-methylthiophenyl)-2-morpholino-propane-1-one, benzylmethylketal, benzophenone, thioxenethone.

It is preferable that the mole ratio of multifunctional (metha) acrylate and mono- or di-functional (meth) acrylate or N-vinyllactam is between 1 to 2 and 2 to 1. Also it is preferable that the coat thickness of the ultra violet hardening resin coat is 1 to 30 μm, more preferable 3 to 15 μm. The ultra violet hardening resin coat of such configuration is superior in anti-scratch ability and anti-abrasion, also being excellent in adhesion and being hard to peel and crack the coat.

It is possible to adopt means such as rotating coating, brush coating, dipping coating, spray coating, flow coating and other suitable means to form such ultra violet hardening coat. Rotating coating is preferable from the point of view of workability, coating homogeneity and coating smoothness.

It is preferable for the antistatic coat provided on the surface of said hardening coat of the optical information recording medium in this invention that its surface electrical resistance value is not more than $5 \times 10^3 \Omega/\square$, preferably not more than $1 \times 10^{13} \Omega/\square$, and/or the half-value period of charged static electricity is not more than 20 seconds, preferably not more than 5 seconds.

Coating can be carried out by means of direct coating of a system of cation, a system of anion, a system of non-ion or a system of ampho-ion for forming the antistatic coat, or by means including transparent conductive ceramics such as $SnO_2$, InO, ZnO, $TiO_2$ or surface active agents into acryl resin, urethane resin or melamine resin and hardening them, by means of an antistatic coat of a system of silica having siloxane combination. Among them, the antistatic coat of a system of silica having siloxane combination is preferable from the point of view of antistatic characteristics, hardness, adhesion to the ultra violet hardening coat, workability and productivity.

Especially, it is preferable that the antistatic coat of a system of silica having siloxane combination has many hydroxyl groups per unit area in the outer-most surface which is exposed to the atmosphere. Also it is preferable that the coat have no structural defect in it and forming a well-regulated siloxane combination.

It is preferably that the coat thickness of the antistatic coat is 0.01 to 1 μm, more preferably 0.05 to 0.5 μm. It is possible to use means such as rotating coating, brush coating, dipping coating, spray coating, flow coating and other suitable means to form such antistatic coat. The rotating coating is preferable from the view point of workability, coating homogeneity and coating smoothness.

In the optical information recording medium of this invention, it is preferable that the hardening coat and the antistatic coat are laminated in this order from the side of the substrate and the antistatic coat is located in the outermost surface, because this way offers an optical information recording medium having high durability that prevents invasion of water and impurities including the materials comprising the antistatic coat into the recording layer through the substrate, and prevents any changes in quality of the recording layer. Moreover, it is preferable to laminate the hardening coat and the antistatic coat, since laminating the antistatic coat on the hardening coat results in the antistatic coat having high hardness.

Further, in the optical information recording medium having lamination of the hardening coat and the antistatic coat in this order from the substrate and the antistatic coat being located in the outermost surface, it is specially preferable that the tensile strength of the hardening coat is not less than 200 kg/cm² (at 20° C.), and/or the elongation percentage is not more than 10% (at 20° C.), and/or the elastic modulus is not less than $5 \times 19^9$ dyne/cm (at 25° C., 3.5 Hz in frequency) and the water vapor transmission ratio is not more than 250 g/m²·2.24 hr. (at thickness of coat 100 μm, temperature 60° C., relative humidity 90%), since such hardening coat can not be cracked easily even when the substrate is deformed a little by heat or moisture, and deterioration of the recording coat by water or impurities is thereby prevented.

It is also preferable for such recording medium comprising by lamination of such hardening coat and the antistatic coat that its surface hardness (pencil hardness) is not less than HB, and/or the degree of cloudiness is not more than 20% after the abrasion test, and/or almost never be scratched in steel-wool test, and the surface electricity resistance value is not more than $5 \times 10^{13} \Omega/\square$, and/or the half-value period of the charged static electricity is not more than 20 seconds.

Explanation of Signs
1 the substrate
2 the recording coat
3 the hardening coat
4 the antistatic coat
5 the adhesive layer

DESCRIPTION OF THE PREFERRED EMBODIMENTS

Figure 1:
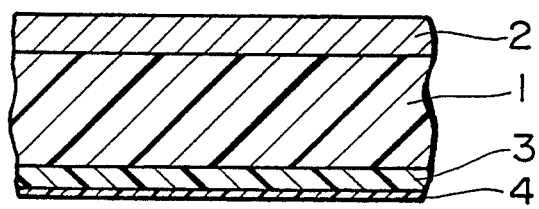
FIG. 1 illustrates an outline of the cross sectional view of the optical information recording medium of a first embodiment of this invention.
Figure 2:
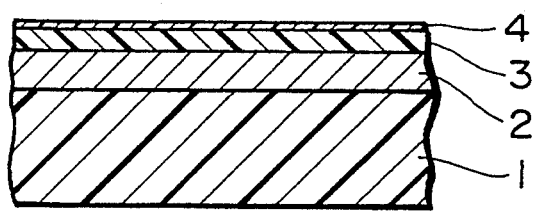
FIG. 2 illustrates an outline of the cross sectional view of the optical information recording medium of a second embodiment of this invention.
Figure 3:
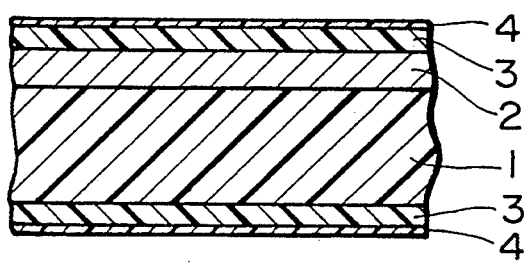
FIG. 3 illustrates an outline of the cross sectional view of the optical information recording medium of a third embodiment of this invention.
Figure 4:
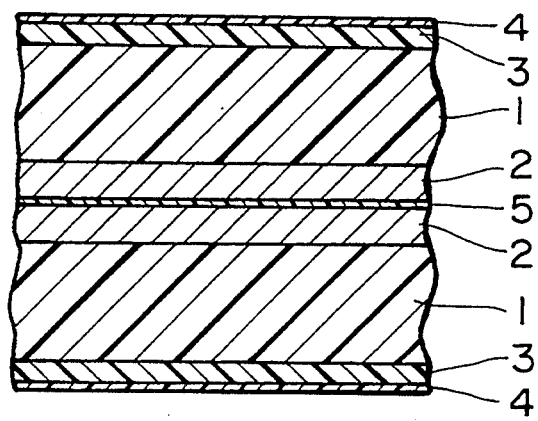
FIG. 4 illustrates an outline of the cross sectional view of the optical information recording medium of a fourth embodiment of this invention.

A cross section of the optical information recording medium of this invention is shown as an embodiment of FIG. 1 to FIG. 4. In the optical information recording medium shown in FIG. 1, the recording layer 2 is formed on a side of the substrate 1, and the hardening coat 3 and the antistatic coat 4 are laminated in order on another side of the substrate 1. In the optical information recording medium shown in FIG. 2, the recording layer 2, the hardening coat 3 and the antistatic coat 4 are laminated in order on a side of the substrate 1. In the optical information recording medium shown in FIG. 3, the recording layer 2, the hardening coat 3 and the antistatic coat 4 are laminated in order on a side of the substrate 1, and the hardening coat 3 and the antistatic coat 4 are laminated in order on another side of the substrate 1. In the optical information recording medium shown in FIG. 4, two structures, which are formed so that the recording layer 2 is formed on a side of the substrate 1 and the hardening coat 3 and the antistatic coat 4 are laminated in order on another side of the substrate 1, are pasted on each recording layer 2 with the adhesive layer 5. It is possible to adopt a monolayer of recording coat, recording coat/protection coat, protection coat/recording coat/protection coat, or protection coat/recording coat/protection coat/reflection coat for the structure of the recording layer 2. It is possible to adopt magneto-optical recording materials, materials which are removed by heating such as chalcogen materials etc. as the materials comprising a recording coat. A dielectric and organic materials etc. can be used materials for a protection coat. Aluminum or aluminum alloy etc. can be used materials comprising a reflection coat.

EXAMPLE 1

A recording layer on a polycarbonate substrate is prepared by applying the following coating A as an ultra violet hardening resin coat by rotating coating on the opposite surface of the substrate, and a hardening coat of a thickness 10 μm by irradiation with a high pressure mercury lamp.

The hardening coat has a tensile strength of 300 kg/cm$^2$ (at 20° C.), an elongation percentage of 5% (at 20° C.), an elastic modulus of $3.5 \times 10^{10}$ dyne/cm (at 25° C., frequency 3.5 Hz) and the water vapor transmission ratio is 106 g/m$^2$·24 hr. (at thickness of coat 10 μm, temperature 60° C., relative humidity 90%).

| Coating A for the ultra violet hardening resin coat | |
| --- | --- |
| pentaerythrytoltetraacrylate | 50 parts by weight |
| pentaerythrytoltriacrylate | 25 parts by weight |
| N-vinyl-2-pyrrolidone | 25 parts by weight |
| 1-hydroxycyclohexylphenylketone | 4 parts by weight |

The following coating B as an antistatic coat is then applied by rotating coating on the hardening coat and hardened, so that an antistatic coat of thickness 0.1 μm is obtained and thereby resulting in an optical information recording medium of this invention.

| Coating B for the antistatic coat. | |
| --- | --- |
| ethyl acetate | 45 parts by weight |
| ethyl alcohol | 50 parts by weight |
| silicon tetrachloride | 5 parts by weight |

EXAMPLE 2

In the same way as in Example 1, using a polymethylmethacrylate (PMMA) substrate instead of the PC substrate an optical information recording medium of this invention is thereby obtained.

EXAMPLE 3

Using the following coating C for the ultra violet hardening resin coat instead of the coating A in Example 1, a hardening coat is similarly obtained. Then, using the same coating B in Example 1 an antistatic coat is similarly obtained on the hardening coat resulting in an optical information recording medium of this invention.

In this hardening coat, the tensile strength is 390 kg/cm$^2$ (at 20° C.), the elongation percentage is 5% (at 20° C.), the elastic modulus is $9.0 \times 10^9$ dyne/cm (at 25° C., frequency 3.5 Hz) and the water vapor transmission ratio is 134 g/cm$^2$·24 hr. (at the thickness of coat 100 μm, temperature 60° C., relative humidity 90%).

| Coating C for the ultra violet hardening resin coat. | |
| --- | --- |
| dipentaerythrytolhexaacrylate | 25 parts by weight |
| pentaerythrytolriacrylate | 50 parts by weight |
| tetrahydrofulfurylacrylate | 25 parts by weight |
| 1-phenyl-2-hydroxy-2-methylpropane-1-one | 4 parts by weight |

EXAMPLE 4

Using the same coating A in Example 1 as the hardening coat, then using the antistatic agent Colcoat N-103X (produced by Colcoat Corp.) belonging to a system of siloxane as coating B as the antistatic coat similarly coated on the hardening coat, an optical information recording medium of this invention is thereby prepared.

EXAMPLE 5

Using the following coating D as the ultra violet hardening resin coat instead of the coating A in Example 2, a hardening coat is similarly obtained. Then, using the same coating B as in Example 2 an antistatic coat is similarly obtained on the hardening coat, and an optical information recording medium of this invention is thereby prepared.

In this hardening coat, the tensile strength is 240 kg/cm$^2$ (at 20° C.), the elongation percentage is 10% (at 20° C.), the elastic modulus is $5.5 \times 10^9$ dyne/cm (at 25° C., frequency 3.5 Hz) and the water vapor transmission ratio is 240 g/m$^2$·24 hr. (at thickness of coat 100 μm, temperature 60° C., relative humidity 90%).

| Coating D for the ultra violet hardening resin coat. | |
| --- | --- |
| dipentaerythrytolhexaacrylate | 35 parts by weight |
| trimethylolpropanetriacrylate | 40 parts by weight |
| N-vinyl-2-pyrrolidone | 25 parts by weight |
| 2,2-dimethoxy-2-phenylacetophenone | 4 parts by weight |

EXAMPLE 6

Using the same coating C as in Example 3, a hardening coat is obtained. Then, using the antistatic agent Colcoat R (produced by Colcoat Corp.) belonging to a system of siloxane as coating B as an antistatic coat is similarly obtained on the hardening coat except for heating it at 50° C. for one hour after coating, an optical information recording medium of this invention thereby prepared.

COMPARATIVE EXAMPLE 1

An optical information recording medium is prepared in the same way as in Example 1, except for no antistatic coat being present and comprising only hardening coat on the PC substrate.

COMPARATIVE EXAMPLE 2

An optical information recording medium is prepared in the same way as in Example 1 except for no ultra violet hardening resin coat being present and comprising only an antistatic coat on the PC substrate.

COMPARATIVE EXAMPLE 3

An optical information recording medium is prepared in the same way as in Example 1, except for adding to the coating and hardening coating A of ultra violet hardening resin coat two weight parts of an antistatic agent comprised of a surface active agent (sodium dodecyl benzene sulfonic acid) on the PC substrate instead of having the antistatic coat present. In this comparison, an antistatic coat and an ultra violet hardening resin coat are not separately present as independent coats.

COMPARATIVE EXAMPLE 4

An optical information recording medium is prepared in the same way as in Example 2, except no antistatic coat being present and comprising only the hardening coat on the PC substrate.

COMPARATIVE EXAMPLE 5

An optical information recording medium is prepared in the same way as in Example 2, except no ultra violet hardening resin coat being present and comprising only the antistatic coat on the PC substrate.

COMPARATIVE EXAMPLE 6

An optical information recording medium is prepared in the same way as in Example 2, except for adding to the coating and hardening coating A as an ultra violet hardening resin coat two weight parts of an antistatic agent comprised of a surface active agent (dihydroxyethylstearylamine) instead of having the antistatic coat present. In this comparison, an antistatic coat and an ultra violet hardening resin coat are not separately present independent coats.

COMPARATIVE EXAMPLE 7

An optical information recording medium is prepared by rotating coating a mixed liquid with 50 parts by weight of the same coating A as Example 1 and 50 parts by weight of the same coating B as in Example 2 on a polycarbonate (PC) substrate, heating it for 30 minutes at 30° C. after coating and resulting a coat of 10 $\mu$m thickness by irradiation with a high pressure mercury lamp.

Determination of Characteristics

The optical information recording media which are prepared in the above examples are investigated with regard to characteristics of hardness, anti-abrasion ability, anti-scratch ability, coat adhesion ability, antistatic ability (half-value period and surface electricity resistance) and anti-temperature/anti-moisture ability. The results are as set forth in the following Table.

Hardness Test

Pencil scratching test in accordance with JIS K 5400-1979.

Abrasion Test

The abrasion test with the testing machine regulated in JIS K 7204-1977. Loading 240 g to an abrasion wheel and measuring a value of change of reflection rate $(R_o-R_1)/R_0$ after 50 rotations, shown by percentage. $R_0$ and $R_1$ are respectively reflection rates before and after the test. The light source is a helium-neon laser.

Scratching Test

The scratching test mounting #0000 steel-wool on a 30 mm square metal and its 5 to-and-fro motions on the coated surface under the condition of loading 900 g. The moving speed of the metal material is 10 mm/sec. In the following table, a symbol ◯ means never scratched, a symbol Δ means a little scratched and a symbol X means heavily scratched.

Adhesion Test

The test to determine the adhesive force of the painted coat to the substrate. Cross cutting the testing material reaching to the substrate by a cutter knife, wherein each interval of cutting is 1 mm and 11 lines in each direction and forming 100 cutting squares, then a cellophane tape is stuck on it. After peeling off the tape, square pieces are counted. In the following table, symbol ◯ means never peeled, symbol Δ means that 1 to 50 pieces are peeled and X means that 51 to 100 pieces are peeled.

Half-Value Period Measurement

Measuring the half-value period of generation voltage by the static honest meter produced by Shisido Company. The measuring circumstances are 20° C. temperature, 50% humidity, 8 kV charging voltage and 30 seconds charging time.

Surface Electricity Resistance

Measuring the surface electricity resistance (Ω/☐) with the super isolation resistance/micro ammeter TR-8601 and the measuring sample box TR-42 produced by Advantest Company. The measuring circumstances are 20° C. temperature, 50% humidity, 100V charging voltage and 1 minute charging time.

High-Temperature/High Moisture Test

After leaving a testing piece under conditions of 80° C. temperature, 85% humidity and for 1000 hours, the aspects of the painted coat and recording coat are observed. The symbol ◯ means no changes, the symbol Δ means that a little cloudiness, discoloration, irregularity and exudation are observed, the symbol X means that cloudiness and discoloration are heavy and irregularity and exudation are observed.

|  | A | B | C | D | E | F | G |
|---|---|---|---|---|---|---|---|
| Example 1 | H | 5 | ◯ | ◯ | 1 sec | $7 \times 10^{12}$ | ◯ |
| Example 2 | 4H | 2 | ◯ | ◯ | 1 sec | $5 \times 10^{12}$ | ◯ |
| Example 3 | H | 6 | ◯ | ◯ | 1 sec | $7 \times 10^{12}$ | ◯ |
| Example 4 | H | 5 | ◯ | ◯ | 1 sec | $6 \times 10^{12}$ | ◯ |
| Example 5 | 4H | 2 | ◯ | ◯ | 1 sec | $5 \times 10^{12}$ | ◯ |
| Example 6 | H | 4 | ◯ | ◯ | 1 sec | $8 \times 10^{12}$ | ◯ |
| Comparative Example 1 | H | 5 | ◯ | ◯ | 11 hr. | $>1 \times 10^{16}$ | Δ |
| Comparative Example 2 | 5B | 86 | x | ◯ | 1 sec | $8 \times 10^{13}$ | ◯ |
| Comparative Example 3 | 2B | 38 | Δ | Δ | 30 sec | $6 \times 10^{13}$ | x |
| Comparative | 4H | 3 | ◯ | ◯ | 12 hr. | $>1 \times 10^{16}$ | Δ |

-continued

| | A | B | C | D | E | F | G |
|---|---|---|---|---|---|---|---|
| Example 4 Comparative Example 5 | B | 58 | x | ○ | 1 sec | $7 \times 10^{12}$ | ○ |
| Comparative Example 6 | 3B | 47 | Δ | Δ | 40 sec | $9 \times 10^{13}$ | x |
| Comparative Example 7 | 4B | 73 | x | Δ | 10 hr. | $>1 \times 10^{16}$ | x |

A: Hardness
B: Abrasion
C: Scratching
D: Adhesion
E: Half-Value period
F: Surface Electricity Resistance
G: High-temperature/high-humidity test As is evident from these results, the optical information recording medium of this invention is hard, being superior in mechanical characteristics such as anti-scratching ability and anti-abrasion ability, and superior in antistatic ability, so that dust is hard to adhere, and preservation ability is also excellent, so that it is superior in reliability of recording, replaying, erasing of information signals.

Comparative examples 1 and 4, contrariwise, demonstrate that they are inferior in reliability of recording, replaying, erasing of information signals, because the half-value periods of charged static electricity are long, the surface electric resistances are large, the antistatic abilities are bad, dust can be easily adhered and the preservation abilities under high-temperature/high-humidity conditions are bad.

Further, Comparative Examples 1 and 3 demonstrate that they are inferior in reliability of recording, replaying, erasing of information signals, because they can be easily scratched.

Also, Comparative Examples 3 and 6 demonstrate that they are inferior in reliability of recording, replaying, erasing of information signals, because they can be scratched easily, the surface electricity resistances are large, so that dust can be easily adhered and the preservation abilities under high-temperature/high-humidity conditions are very bad.

Moreover, Comparative Example 7 demonstrates that it is inferior in reliability of recording, replaying, erasing of information signals, because both of the hardness and the antistatic ability are very inferior.

We claim:

1. An optical information recording medium having one or more sides, wherein one or more separate hardening coats and one or more separate antistatic coats are provided on at least one side of the optical information recording medium, said antistatic coats being located on the hardening coats.

2. An optical information recording medium as set forth in claim 1, wherein the hardening coat is an untra violet hardening resin coat.

3. An optical information recording medium as set forth in claim 1, wherein the hardening coat is an ultra violet hardening resin coat comprising multifunctional acrylate having three or more acryloyl groups in the molecule and mono-functional or di-functional (metha) acrylate or N-vinyllactam.

4. An optical information recording medium as set forth in claim 3, wherein the mole ratio of multifunctional (metha) acrylate having three or more acryloyl groups in the molecule and mono-functional or di-functional (metha) acrylate or N-vinyllactam lies between 1 to 2 and 2 to 1.

5. An optical information recording medium as set forth in any one of claims 1 to 4, wherein the coating thickness of the hardening coat is 1 to 30 μm.

6. An optical information recording medium as set forth in any one of claims 1 to 4, wherein the thickness of the antistatic coat is 0.01 to 1 μm.

7. An optical information recording medium as set forth in claim 1, wherein the antistatic coat is located on the outermost surface of the hardening coat.

8. An optical information recording medium as set forth in claim 1, wherein its surface hardness (pencil hardness) is not less than HB, and/or the degree of cloudiness after an abrasion test is not more than 20%, and/or full anti-scratch on steel-wool test, and the surface electrical resistance value is not more than $5 \times 10^{13} \Omega/\square$, and/or the half-value period of charged antistatic electricity is not more than 20 seconds.

* * * * *